United States Patent
Hassan-Ali et al.

(10) Patent No.: US 7,336,662 B2
(45) Date of Patent: Feb. 26, 2008

(54) SYSTEM AND METHOD FOR IMPLEMENTING GFR SERVICE IN AN ACCESS NODE'S ATM SWITCH FABRIC

(75) Inventors: Mudhafar Hassan-Ali, Rohner Park, CA (US); Jeff Mendelson, Petaluma, CA (US); Annie Rastello, Rohnert Park, CA (US); Li-Sheng Chen, Petaluma, CA (US); Radimir Shilshtut, Rohnert Park, CA (US); Sina Soltani, Rohnert Park, CA (US); Francisco Moreno, Petaluma, CA (US)

(73) Assignee: Alcatel Lucent, Paris (FR)

( * ) Notice: Subject to any disclaimer, the term of this patent is extended or adjusted under 35 U.S.C. 154(b) by 1068 days.

(21) Appl. No.: 10/280,700

(22) Filed: Oct. 25, 2002

(65) Prior Publication Data

US 2004/0081164 A1   Apr. 29, 2004

(51) Int. Cl.
*H04L 12/56* (2006.01)
(52) U.S. Cl. .................. 370/395.21; 370/231; 370/235
(58) Field of Classification Search ........ 370/229–231, 370/235–236.2, 395.1–395
See application file for complete search history.

(56) References Cited

U.S. PATENT DOCUMENTS

| | | | |
|---|---|---|---|
| 4,878,048 A | 10/1989 | Gottesman et al. | |
| 5,119,370 A | 6/1992 | Terry | |
| 5,237,565 A | 8/1993 | Henrion et al. | |
| 5,287,355 A | 2/1994 | Takahashi et al. | |
| 5,383,180 A | 1/1995 | Kartalopoulos | |
| 5,396,622 A | 3/1995 | Lee | |
| 5,526,344 A | 6/1996 | Langdon et al. | |
| 5,734,656 A | 3/1998 | Prince et al. | |

(Continued)

FOREIGN PATENT DOCUMENTS

EP   0 901 302 A2   3/1999

(Continued)

OTHER PUBLICATIONS

Knuth, D.E.; "The Art of Computer Programming, vol. 3: Sorting and Searching"; 1983; Addison-Wesley Publishing Company, Inc.; USA.

(Continued)

*Primary Examiner*—Chi Pham
*Assistant Examiner*—Thai Hoang
(74) *Attorney, Agent, or Firm*—Bobby D. Slaton; Danamarj & Emanuelson

(57) ABSTRACT

A scheme for implementing GFR service in an ATM environment, e.g., an access node's ATM switch fabric. Regulation of a GFR flow is throttled between two modes, a guaranteed rate mode and a non-guaranteed rate mode, depending upon timestamps computed by applicable traffic policer/shaper algorithms. A scheduler is operably coupled to a policing block for scheduling cells from a guaranteed flow queue for transport via the ATM fabric at a guaranteed rate upon determining the onset of a guaranteed service frame. The scheduler switches to non-guaranteed rate mode for scheduling cells from the flow queue at a non-guaranteed rate when a timestamp ($TS_{NGF}$) for transmission at the non-guaranteed rate is earlier than a timestamp ($TS_{GF}$) for transmission of a next guaranteed service frame at the guaranteed rate.

27 Claims, 8 Drawing Sheets

U.S. PATENT DOCUMENTS

| | | |
|---|---|---|
| 5,784,371 A | 7/1998 | Iwai |
| 5,850,399 A | 12/1998 | Ganmukhi et al. |
| 5,859,835 A | 1/1999 | Varma et al. |
| 5,862,136 A | 1/1999 | Irwin |
| 5,875,190 A | 2/1999 | Law |
| 5,878,042 A | 3/1999 | Fraas et al. |
| 5,889,773 A | 3/1999 | Stevenson, III |
| 5,896,382 A | 4/1999 | Davis et al. |
| 5,901,024 A | 5/1999 | Deschaine et al. |
| 5,926,479 A | 7/1999 | Baran |
| 5,953,338 A | 9/1999 | Ma |
| 6,064,650 A | 5/2000 | Kappler et al. |
| 6,064,651 A | 5/2000 | Rogers et al. |
| 6,081,507 A * | 6/2000 | Chao et al. .................. 370/235 |
| 6,324,165 B1 * | 11/2001 | Fan et al. .................... 370/232 |
| 6,353,593 B1 | 3/2002 | Chen |
| 6,370,159 B1 | 4/2002 | Eidson |
| 6,389,019 B1 * | 5/2002 | Fan et al. ............... 370/395.42 |
| 6,411,957 B1 | 6/2002 | Dijkstra |
| 6,415,325 B1 | 7/2002 | Morrien |
| 6,434,140 B1 | 8/2002 | Barany et al. |
| 6,480,487 B1 | 11/2002 | Wegleitner et al. |
| 6,480,511 B1 | 11/2002 | Petty |
| 6,574,217 B1 | 6/2003 | Lewis et al. |
| 6,728,239 B1 | 4/2004 | Kung et al. |
| 6,904,060 B2 | 6/2005 | Nelson et al. |
| 6,914,898 B2 | 7/2005 | Sasagawa et al. |
| 6,950,441 B1 | 9/2005 | Kaczmarczyk et al. |
| 2002/0136230 A1 * | 9/2002 | Dell et al. .................. 370/416 |

FOREIGN PATENT DOCUMENTS

| | | |
|---|---|---|
| EP | 0 961 512 A1 | 12/1999 |
| EP | 1 093 266 A2 | 4/2001 |
| EP | 1 111 855 A2 | 6/2001 |
| EP | 1 111 858 A2 | 6/2001 |
| EP | 0 522 773 A2 | 5/2004 |
| EP | 0 713 347 A2 | 5/2004 |
| WO | 97/04558 | 2/1997 |
| WO | 00/11880 A2 | 3/2000 |
| WO | 01/86884 A1 | 11/2001 |

OTHER PUBLICATIONS

Giroux, Natalie and Ganti, Sudhakar, "Queuing and Scheduling", Quality of Service in ATM Networks: State of the Art Traffic Management, Chapter 5, pp. 85-121, 1999.

Kaufman, Jill et al "ATM Forum Education Corner", at http://www.atmforum.com/pages/library/53bytes/hackissues/others/53bytes-0994-4.html, 2002.

Traffic Management Specification, The ATM Forum Technical Committee, Version 4.1, AF-TM-0121.000, Mar. 1999.

* cited by examiner

SYSTEM AND METHOD FOR IMPLEMENTING GFR SERVICE IN AN ACCESS NODE'S ATM SWITCH FABRIC

CROSS-REFERENCE TO RELATED APPLICATION(S)

This application discloses subject matter related to the subject matter disclosed in the following commonly owned co-pending U.S. patent applications: (i) "Stackplane Architecture," filed Dec. 22, 1999, application Ser. No. 09/469,897, in the names of James W. Dove et al.; (ii) "Scalable Architecture For An Access Node," filed Jun. 27, 2002, application Ser. No. 10/184,386, in the name(s) of Eric Friedrichs et al.; (iii) "Integrated Gateway Functionality In An Access Network Element," filed Nov. 2, 2001, application Ser. No. 10/052,846, in the names of Thornton Collins et al.; (iv) "Multicasting System And Method For Use In An Access Node's ATM Switch Fabric," filed even date herewith, application Ser. No. 10/280,959, in the names of Mudhafar Hassan-Ali et al.; (v) "Virtual Group Connection Scheme For ATM Architecture In An Access Node," filed even date herewith, application Ser. No. 10/280,604, in the names of Mudhafar Hassan-Ali et al.; (vi) "Calendar Heap System And Method For Efficient Sorting," filed even date herewith, application Ser. No. 10/281,033, in the names of Mudhafar Hassan-Ali et al.; (vii) "Hierarchical Scheduler Architecture For Use With An Access Node," filed even date herewith, application Ser. No. 10/280,894, in the names of Mudhafar Hassan-Ali et al., which are hereby incorporated by reference herein for all purposes.

BACKGROUND OF THE INVENTION

1. Technical Field of the Invention

The present invention generally relates to telecommunications. More particularly, and not by way of any limitation, the present invention is directed to a system and method for implementing Guaranteed Frame Rate service (GFR) in an access node's Asynchronous Transfer Mode (ATM) switching fabric.

2. Description of Related Art

The remote access market is undergoing a major metamorphosis. Three factors serve as catalysts for change. The first is the growing number of users, for example, small office/home office (SOHO) users, demanding high performance Internet and remote access for multimedia. Liberalized governmental activity with respect to telecommunications is another factor, which is fostering broader competition through deregulation in local area markets everywhere. The third and final factor is congestion in the Public Switched Telephone Network (PSTN), originally designed and developed for voice-only traffic.

There have been several important advances in telecommunications technology that enable high rates of throughput in carrier networks' backbone connections. For example, by implementing Asynchronous Transfer Mode (ATM) networking technology over a Synchronous Optical Network (SONET)/Synchronous Digital Hierarchy (SDH) physical layer, carrier networks can achieve data rates of up to several hundred megabits per second (Mbps). However, efforts to meet the bandwidth demand for remote access have been beset by the limitations of the existing twisted-pair copper cable infrastructure (i.e., access network) provided between a carrier's central office (CO) and a subscriber's remote site, typically referred to as the local loop. In the telecommunications art, these limitations are sometimes collectively described as the "last-mile" problem.

Current access network solutions that attempt to avoid the bottleneck created by the last-mile problem involve the use of fiber optic technology in the local loop also. As with the high-speed carrier networks, the fiber-based local loop infrastructure is typically architected using SONET as the physical layer technology. With recent developments in optical components and related opto-electronics, in addition to improvements in network design, broadband access is now becoming commonplace.

Moreover, coupled with the phenomenal growth in popularity of the Internet, there has been a tremendous interest in using packet-switched network (PSN) infrastructures (e.g., those based on Internet Protocol (IP) addressing) as a replacement for the existing circuit-switched network (CSN) infrastructures used in today's telecommunications networks. From the network operators' perspective, the inherent traffic aggregation in packet-switched infrastructures allows for a reduction in the cost of transmission and the infrastructure cost per end-user. Ultimately, such cost reductions enable the network operators to pass on the concomitant cost savings to the end-users.

Accordingly, a new breed of service-centric networks (distinct from the existing voice-centric and data-centric networks) are being explored for implementation on what is known as the next-generation network (NGN) infrastructure, where integrated voice/data/video applications may be provisioned using a packet transport mechanism over a PSN in an end-to-end transmission path. As alluded to hereinabove, it is believed that using a packet network infrastructure in access networks provides higher transmission efficiency, lower operation and maintenance costs, and a unified access.

Traditional access systems allow accessing a digital local voice switch, such as a Class 5 switch, by extending a plurality of metallic loops and aggregating them in a bundle for efficiently transmitting the time-division multiplexed (TDM) voice traffic. Typically, such access networks are architected using one or more access nodes in a variety of configurations, e.g., point-to-point chains, rings, etc., wherein an access node may itself comprise several channel banks that provide line interfaces servicing a large number of subscribers.

In order to afford increased levels of functionality and service provisioning, however, access networks of today are being required to support advanced transport mechanisms such as SONET for the internal architecture of the nodes as well. In such nodes, ATM is used for carrying most of the subscriber traffic, except the traditional TDM services such as T1 and TDM-DS3 services. Accordingly, both TDM as well as ATM switching fabrics need to be supported in the access node design.

The ATM Forum provides a set of specifications governing the various aspects of an ATM switching fabric, including traffic policing/shaping functionality that is necessary to support different Classes of Service (CoS) such as Constant Bit Rate (CBR), Variable Bit Rate (VBR), Guaranteed Frame Rate (GFR), and the like. Whereas the provisioning of GFR services is particularly desirable in certain data applications, the standard ATM specifications do not set forth any specific implementation or design details.

On the other hand, known GFR implementations in current ATM applications have been found to be wanting with respect to certain important issues, however. First, the existing GFR schemes are generally memory intensive, as they are implemented with a buffer structure that is common to both guaranteed and non-guaranteed portions of a GFR flow.

Moreover, such schemes are not versatile enough to be commensurate with the applicable GFR service feature set of the ATM specification.

SUMMARY OF THE INVENTION

Accordingly, the present invention provides a scheme for implementing GFR service in an ATM environment (e.g., an access node's ATM switch fabric) that advantageously overcomes the aforesaid shortcomings. Regulation of a GFR flow is throttled between two modes, a guaranteed rate mode and a non-guaranteed rate mode, depending upon timestamps computed by applicable traffic policer/shaper algorithms, whereby rates higher than a minimum guaranteed rate can be achieved when bandwidth is available.

In one aspect, the present invention is directed to a method for implementing GFR service in an access network element having an ATM switching fabric. The method commences with enqueuing incoming cells identified for guaranteed service in a guaranteed flow queue. Upon determining the onset of a guaranteed service frame, the method is operable to schedule cells from the guaranteed flow queue for transport via the ATM switching fabric at a guaranteed rate. Thereafter, two future timestamp values are determined, a timestamp $TS_{GF}$ for scheduling a next guaranteed service frame and a timestamp $TS_{NGF}$ for scheduling cells from the guaranteed flow queue at a non-guaranteed rate. The cells from the flow queue are scheduled for transport at the non-guaranteed rate if $TS_{NGF}$ is earlier than $TS_{GF}$. Thereafter, when $TS_{GF}$ arrives, a next guaranteed service frame is scheduled for transport at the guaranteed rate. Any unfinished frame scheduled using the non-guaranteed mode may be discarded.

In another aspect, the present invention is directed to a system for implementing GFR in an ATM switching fabric. A GFR policing block is provided for enqueuing incoming cells identified for guaranteed service in a guaranteed flow queue. A scheduler is operably coupled to the policing block for scheduling cells from the guaranteed flow queue for transport via the ATM switching fabric at a guaranteed rate upon determining the onset of a guaranteed service frame. Further, the scheduler is also operable to schedule cells from the flow queue at a non-guaranteed rate when a timestamp ($TS_{NGF}$) for transmission at the non-guaranteed rate is earlier than a timestamp ($TS_{GF}$) for transmission of a next guaranteed service frame at the guaranteed rate.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

An embodiment of the present invention will now be set forth in light of the teachings provided in the commonly owned co-pending U.S. patent application entitled "Hierarchical Scheduler Architecture For Use With An Access Node," filed even date herewith, application Ser. No. 10/280,894, in the names of Mudhafar Hassan-Ali et al., (hereinafter, the *Hierarchical Scheduler Architecture* application), incorporated by reference hereinabove. As described in detail in that application, a telecommunications node disposed in an access network may be comprised of a scalable architecture wherein both TDM and ATM switching fabrics are provided in order to support increased levels of functionality. Additionally, the scheduling functionality associated with the ATM switching fabric can be partitioned on a per-service category basis and across a plurality of hierarchical data pipe aggregations (i.e., subport, bus level, shelf level, stackplane level, and pipe level, et cetera, treated as aggregation layers) as may be necessitated by the scalable hardware architecture so that traffic contract compliance as well as requisite connection isolation and fair bandwidth allocation can be effectively achieved in the ATM switching fabric of an access network node.

Figure 1:
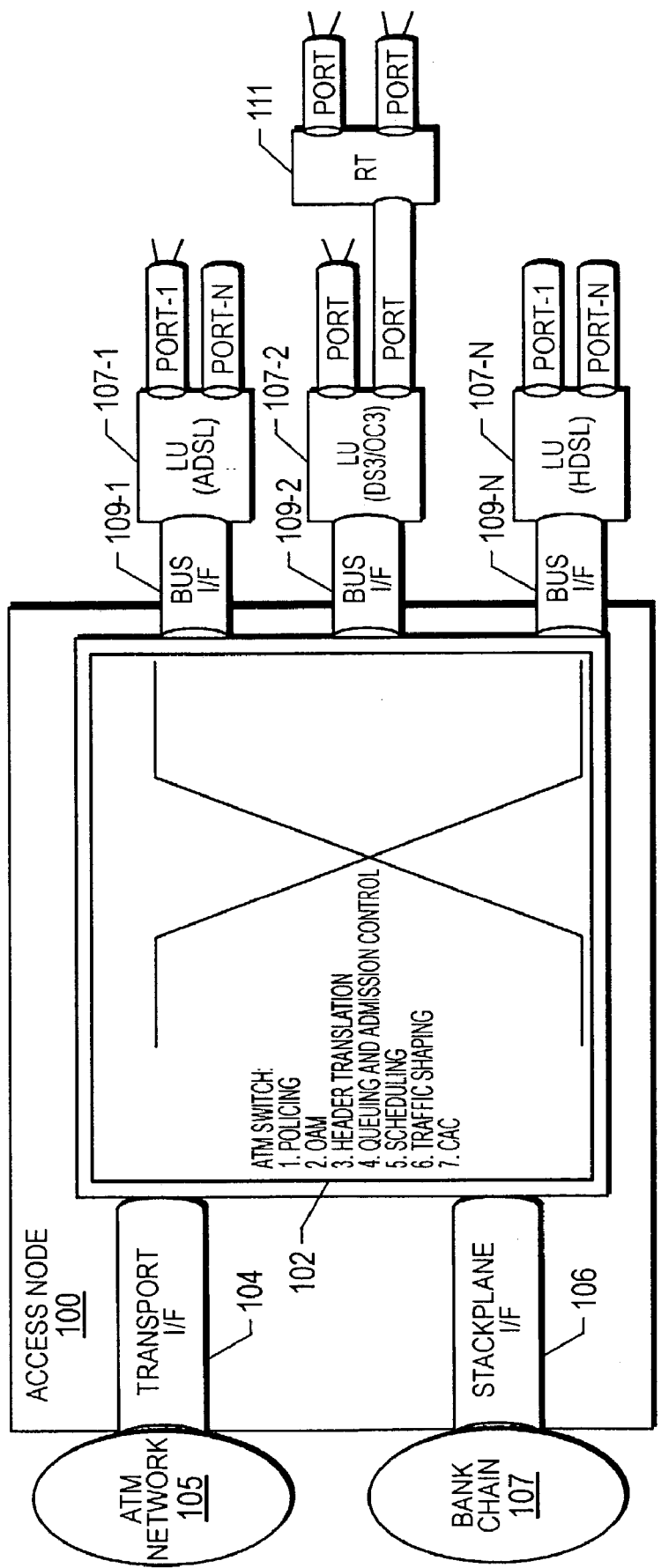
FIG. 1 depicts an exemplary access node having an ATM switching fabric wherein the teachings of the present invention may be advantageously practiced.

Referring now to the drawings of the present patent application, wherein like or similar elements are designated with identical reference numerals throughout the several views thereof and the various elements depicted are not necessarily drawn to scale, and referring in particular to FIG. 1, depicted therein is an exemplary access node 100 having a high level functional representation of an ATM switch fabric 102, wherein the teachings of the present invention may be advantageously practiced. As explained in the *Hierarchical Scheduler Architecture* application referenced above, the overall functionality of the switch fabric 102 includes: policing; operation, administration and maintenance (OAM); header translation; queuing; scheduling and traffic shaping; and Connection Admission Control (CAC). As can be readily seen, traffic to the fabric 102 is provided via a number of interfaces. A transport interface 104 is operable to connect the node's fabric to a backbone network, e.g., ATM network 105. A stackplane interface 106 is operable to carry the traffic from a secondary shelf bank chain 107 (e.g., comprising channel banks 506-1 through 506-4 and channel banks 508-1 through 508-4 shown in FIG. 5 of the *Hierarchical Scheduler Architecture* application) to the fabric 102. A plurality of subscriber interfaces via line units (LUs) 107-1 through 107-N exemplify various service sources such as xDSL, T1, ISDN, DS-3/OC-3, etc., that can interface with the fabric 102 through appropriate bus level ports 109-1 through 109-N. One of the ports of a line unit may be coupled to an RT 111 as part of an access network (not shown in this FIG.).

Two types of ATM connections may be defined with respect to the internal ATM traffic: Virtual Channel Connections (VCCs) and Virtual Path Connections (VPCs). A VCC is typically the lowest flow granularity an ATM connection may have, which is identified by a unique value comprising a pair of identifiers, i.e., Virtual Channel Identifier (VCI) and Virtual Path Identifier (VPI), on a physical interface. A VPC, on the other hand, is defined as a group of all flows that share the same VPI value and a common pool of resources (e.g., bandwidth, et cetera). Thus, it can be seen that a VP is a bundling of VCs which can simplify the management of the connections in an ATM environment by reducing the number of elements to manage, wherein each connection is identified by its unique VPI/VCI pair.

From the standpoint of topology, a VCC or a VPC can be either of the following two types: (i) point-to-point connections, wherein bi-directional connections are established and the sources in each direction may be different and (ii) point-to-multipoint connections, which typically utilize a plurality of uni-directional connections for multicast transport across the fabric.

In addition, another level of ATM connection hierarchy, called a Virtual Group Connection or VGC, may be implemented within the context of the present invention. Additional details regarding the VGC implementation are provided in the following the commonly owned co-pending U.S. patent application entitled "Virtual Group Connection Scheme For ATM Architecture In An Access Node," filed even date herewith, application Ser. No.: 10/280,604, in the names of Mudhafar Hassan-Ali et al., incorporated by reference hereinabove.

Ingress traffic management with respect to the flows presented to the switch fabric 102 (whose functionality may be embodied as an ATM cross-connect fabric (XCF) card) accordingly encompasses three stages in general: policing, VC queue/buffer allocation and shaping/scheduling. In one implementation, hardware relating to these stages may be integrated within the XCF card. The primary function of a policer is to ensure that the received cells are compliant with respect to applicable connection descriptors. If not, the incoming cells may be dropped or marked (i.e., tagged) by clearing/setting a Cell Loss Priority (CLP) field in their header portion. In general, the policing functionality is implemented by utilizing well known algorithms described in ITU-T 1.371 and ATM Forum ATMF-TM-121 standards. Essentially, these algorithms (typically categorized as a Generic Cell Rate Algorithm or GCRA) use what is known as a credit counter called bucket and the credit known as tokens. If there is enough credit (i.e., tokens) in the counter (i.e., bucket) upon receiving a cell, then the cell is admitted; otherwise, the cell is tagged as a lower priority cell or discarded. Furthermore, as explained in the *Hierarchical Scheduler Architecture* application, the GCRA-based algorithms can be implemented in what is known as a Leaky Bucket Module (LBM) for both traffic policing and traffic shaping (i.e., scheduling) purposes with respect to several ATM traffic Classes (categorized based on a Class of Service (CoS) that is defined by such factors as the time sensitivity, peak and sustained bandwidth guarantees, burstiness and delivery guarantees).

The hierarchical scheduling functionality is implemented by means of a Priority Queue Module (PQM) (not shown in this FIG.), wherein each layer performs the scheduling function for an entry, which can be one of the following based on the flow aggregation: subport, bus, port, and pipe. Essentially, when a cell of new flow is received by the fabric, this data flow is represented by one entry in the scheduler as follows. A Flow ID (i.e., FID) is received from the LBM and, based on the CoS/QoS, the data of the flow (i.e., FID and timestamp or TS) are stored in the applicable layer-1 data structure. From all competing subports in layer-1 (e.g., different flows from a line unit), only one with the minimum TS is selected by the layer arbiter, which is then forwarded to the next layer's arbitration, i.e., layer-2 arbitration. The layer-2 data structure accordingly contains "winner FID/TS" data from different subports. Again, only one entry having the minimum TS is selected to be forwarded to layer-3. The scenario is thus successively repeated for additional aggregation layers, which ultimately results in a winner nominee (i.e., the FID/TS data of the winning cell) for each service priority category. Further, as pointed out in the *Hierarchical Scheduler Architecture* application, the layer-based arbitration is performed for each service category plane so as to result in a winner nominee for each plane, whereupon a CoS-aware timestamp-based arbiter selects a final winner by arbitrating among nominees from each service plane.

Figure 2:
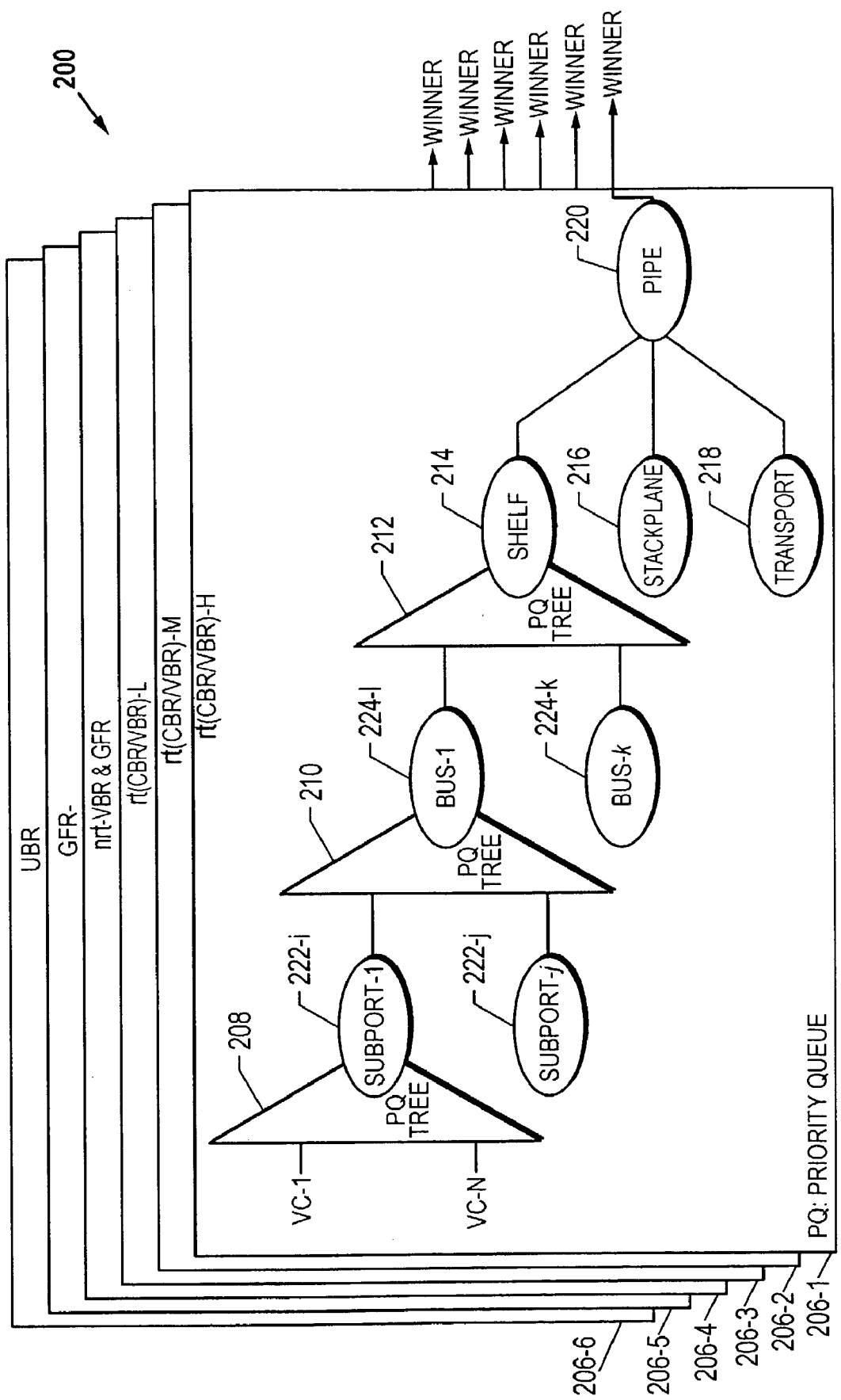
FIG. 2 depicts an embodiment of a multi-layer, multi-plane scheduler operable to implement GFR service in the ATM switching fabric shown in FIG. 1.

It should therefore be recognized that arbitration at each layer involves managing the PQ structures associated therewith for selecting a winner for that layer. In general, the PQ structures are implemented in a tree fashion, wherein the data nodes (representing, e.g., the TS/FID of the admitted cell or the cell selected from the lower layer) are arranged in accordance with certain insertion/deletion rules. FIG. 2 depicts an embodiment of a multi-layer, multi-plane scheduler 200 operable to implement a Guaranteed Frame Rate (GFR) service in the ATM switching fabric shown in FIG. 1. Each of the PQ entities of the scheduler 200 at each aggregation layer is shown as a tree structure, resulting in an overall nested tree arrangement for each service plane. The following table sets forth various exemplary services and associated parametric information:

TABLE I

| Class of Service | Applications | Parameters |
|---|---|---|
| Real time Constant Bit Rate (CBR), real time Variable Bit Rate (rt-VBR) | Voice (single channel or trunk), VBR video, games | Peak Cell Rate (PCR), Cell Delay Variance Tolerance (CDVT) |
| Non-real time Variable Bit Rate (nrt-VBR) | Data, multimedia, email, video streaming | PCR, CDVT, Sustainable Cell Rate (SCR), Maximum Burst Size (MBS) |
| Guaranteed Frame Rate (GFR) | Premium Data, Web browsing, Internet | PCR, CDVT, MBS, Maximum Cell Rate (MCR), Maximum Frame Size (MFS) |
| Best effort (Unspecified Bit Rate or UBR) | Inexpensive data, Web browsing and Internet | PCR, CDVT |

Additional details relating to the parametric data and QoS levels can be found in the *Hierarchical Scheduler Architecture* application. Continuing with FIG. 2, reference numerals 206-1 through 206-6 refer to the following service planes: rt[CBR/VBR]—HIGH plane, rt[CBR/VBR]—MEDIUM plane, rt[CBR/VBR]—LOW plane, nrt-VBR and GFR plane, GFR-plane, and UBR (i.e., Best Effort) plane, respectively. Reference numeral 208 refers to the PQ tree corresponding to a subport arbiter 1305-*i*, wherein the PQ tree is formed based on the VC connections supported by the corresponding subport. Essentially, each subport of the scheduler uses (or builds) a PQ which is a data structure that stores all active FIDs (i.e., the VC queue associated with the FID has at least one cell in it). The winners from all the subport arbiters (e.g., subport arbiters 222-*i* and 222-*j*) are forwarded to populate the next-level PQ tree structure 210 associated with a bus level arbiter 224-*l*. Likewise, the bus level arbiters 224-*l* and 224-*k* forward the respective selections to a shelf level PQ structure 212. A shelf level arbiter 214, a stackplane interface 216, a transport level interface 218 forward their selections to a pipe level arbiter 220 that selects a winner nominee for a particular service plane.

A number of data structures can be provided to implement the tree-based PQs used in the context of hierarchical scheduling as set forth in the present patent application. In one exemplary implementation of the present invention, the PQ entities may be embodied as a heap structure. Whereas the heap implementation is generally optimal in memory utilization, it suffers from algorithmic complexity that can limit the throughput in a high-speed design. In another implementation, accordingly, the layer-specific PQ entities are embodied as a hybrid "calendar heap" structure, which is described in additional detail in the commonly owned co-pending U.S. patent application entitled "Calendar Heap System And Method For Efficient Sorting," filed even date herewith, application Ser. No. 10/281,033, in the names of Mudhafar Hassan-Ali et al., incorporated by reference hereinabove.

Figure 3:
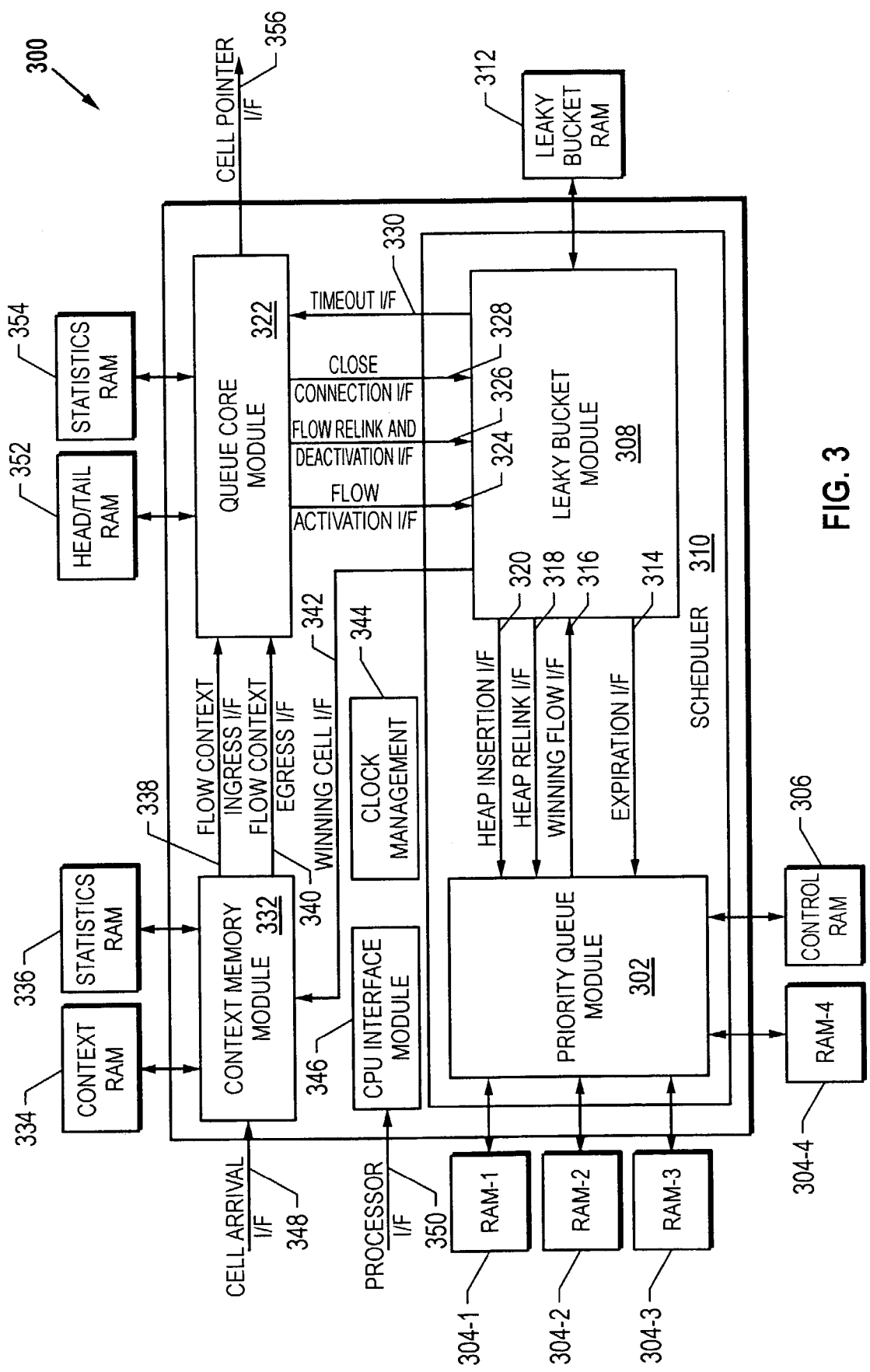
FIG. 3 depicts a high level functional block diagram illustrating a Leaky Bucket Module and a Priority Queue Module of the scheduler for implementing the teachings of the present invention.

Referring now to FIG. 3, depicted therein is a high level functional block diagram illustrating a switch fabric card 300 that includes a scheduler block 310 for implementing a GFR service in an access node in accordance with the teachings of the present invention. The scheduler block 310 is comprised of a PQM 302 and an LBM 308 having a number of interfaces therebetween to effectuate message/data communication relating to scheduler operations. These interfaces comprise a time expiration interface 314, a winning flow interface 316, a heap/flow relink interface 318, and a heap/flow insertion interface 320. The PQM block 302 is further interfaced with a plurality of memory blocks 304-1 through 304-4 for storing the various PQ data structures relating to the hierarchical scheduler architecture described above. A control memory 306 coupled to the PQM block 302 is operable to store control program code relating to the PQM's operations.

The LBM block 308 is also interfaced with one or several memory blocks, e.g., memory 312, operable to store information relating to the policing and shaping algorithmic processes effectuated by the LBM. In one implementation, the LBM is operable to effectuate a Leaky Bucket Calculator as a state machine that determines the eligibility of a cell according to the traffic contract and the history of the connection it belongs to. When used for policing, the state machine determines the compliance of the incoming cells, whereas when used in shaping, it determines the time when the cell is eligible for service. Depending on the service Class, one or more specific algorithmic processes with particular parametrics (i.e., traffic descriptors, Leaky Bucket parameters (Theoretical Arrival Time or TAT, TS values, cell arrival times, etc.) are provided in order to effectuate the LBM's policing and shaping operations. As will be described in detail below, the GFR service of the present invention is implemented using two separate algorithmic LB processes, each with a separate set of parametrics, that are operable to regulate a guaranteed flow portion and a non-guaranteed flow portion, respectively.

The LBM block 308 is also interfaced to a Context Memory Module (CMM) 332 and a Queue Core Module (QCM) 322 in order to achieve its overall functionality of maintaining the Leaky Bucket information for all the flows serviced by the ATM fabric. A cell arrival interface 348 associated with the CMM block 332 operates as the entry point for incoming cells. A context memory 334 associated with the CMM block 332 is operable to store flow-based information such as QoS, FID, Leaky Bucket parameters, Destination Path Tag (DPT) information, etc. Also, a statistics memory block 336 may be provided for collecting performance monitoring data relative to the connections served by the ATM switch fabric card 300. Ingress flow context information and egress flow context information is provided to the QCM block 322 via interfaces 338 and 340, respectively. A head/tail pointer memory 352 and a statistics memory 354 are coupled to the QCM block 322. A cell pointer interface 356 associated therewith is used for pointing to cells eligible for service based on scheduling operations.

Interfacing between the QCM block 322 and LBM block 308 includes the following: a Flow Activation interface 324, a Flow Relink and Deactivation interface 326, a Close Connection interface 328 and a Timeout interface 330. A winning cell interface 342 provided between the LBM block 308 and CMM block 332 is operable to transmit information regarding the winner cells. Further, a clock management block 344 and a processor interface module 346 having a processor interface 350 are also provided.

In view of the various structural blocks described above, the overall functionality of the LBM block 308 includes the following:

Flow Activation: When a cell arrives and the cell buffer relative to its FID was previously empty, a Flow Activation message is sent by the QCM to the LBM. This interface contains the information found in the context memory relative to the flow.

Winning Flow and Flow Relink/Deactivation: When a flow is chosen as the winner by the PQM, it is deleted from the different heaps it belongs (depending on the aggregation layers, for instance). If there are cells remaining in the cell buffer of that specific flow, then the LBM recalculates the TS values and relinks the flow in the PQ data structures. If there is no cell remaining, the LBM calculates the TS values for that flow and stores them in the Leaky Bucket memory until another cell arrives for that flow.

Close Connection: If the CAC suppresses a flow, the cell buffer is flushed and the FID may be reused for another connection. In order to prevent use of the old parameters for the new connection, the LBM has to be informed that this flow is no longer valid.

Time Expiration/Timeout: The Leaky Bucket memory is checked, preferably periodically, in order to prevent the storage of expired times.

Figure 4:
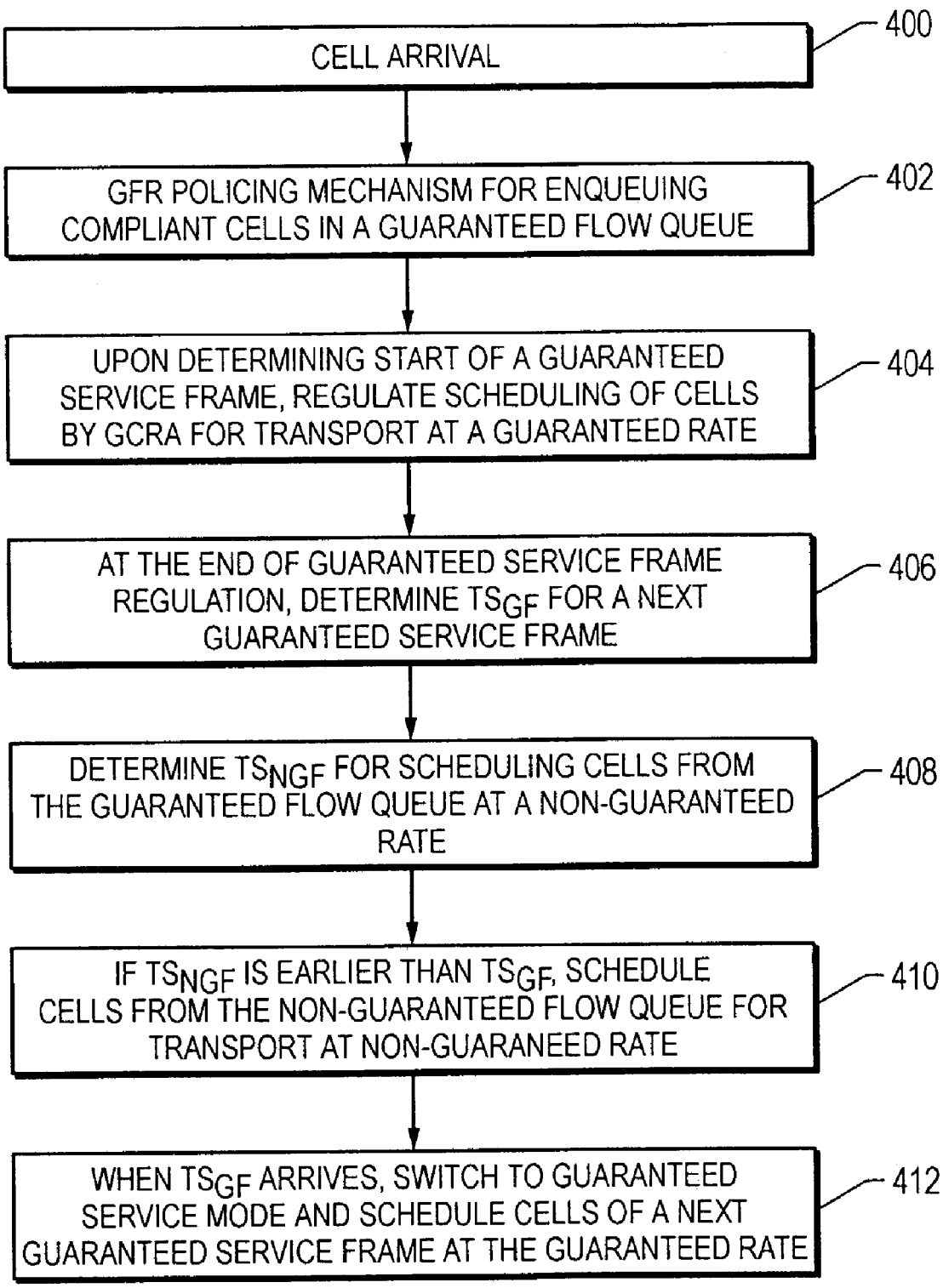
FIG. 4 is a flow chart of the various operations involved in an exemplary methodology for implementing the GFR service in accordance with the teachings of the present invention.

FIG. 4 is a flow chart of the various operations involved in an exemplary methodology for implementing the GFR service in an ATM fabric in accordance with the teachings of the present invention. Upon cell arrival (block 402), a GFR policing mechanism performs traffic policing so that compliant cells are appropriately enqueued in a guaranteed flow queue (block 402). In one implementation, the policer may tag the cells using the CLP bit based on non-compliance; thereafter the cells may be enqueued in one buffer that has a threshold, $GFR_{TH}$. Appropriate cell discard mechanisms, discussed in greater detail in the *Hierarchical Scheduler Architecture* application, may be applied at this juncture.

Essentially, the GFR flow is shaped such that two separate sub-flows are effectuated wherein one flow generation uses a GCRA process with the traffic descriptor parameters Peak Cell Rate (PCR) and Cell Delay Variance Tolerance (CDVT) and the second flow generation uses what is referred to as a Frame-GCRA or F-GCRA process having the parameters Maximum Cell Rate (MCR) and Maximum Burst Size (MBS) in addition to the PCR and CDVT parameters. Upon determining start of a frame that is considered guaranteed (i.e., the onset of a guaranteed service frame), the cells of the guaranteed flow queue comprising the frame are regulated using the GCRA process for transport at a guaranteed rate (block 404). As specified elsewhere, the guaranteed rate may be predetermined in accordance with applicable traffic contract(s). At the end of guaranteed service frame regulation (i.e., after scheduling the last cell of the frame), a future timestamp ($TS_{GF}$) for a next guaranteed service frame is determined by using the F-GCRA process (block 406). The $TS_{GF}$ is inserted into the appropriate PQ buffer associated with the guaranteed service sub-flow. Another timestamp, denoted $TS_{NGF}$, is also determined by using the GCRA process in the LBM, for scheduling cells from the guaranteed flow queue for transport at a non-guaranteed rate (block 408). This $TS_{NGF}$ is inserted into a PQ buffer applicable with respect to the applicable non-guaranteed service rate, e.g., a Best Effort service or UBR service.

Switching from the guaranteed mode of scheduling (i.e., GFR mode) to non-guaranteed mode (i.e., "GFR-" mode, which can be at UBR) is based on the relationship between the two future timestamp values, i.e., $TS_{GF}$ and $TS_{NGF}$ values, computed as set forth above. A determination is made to verify if the $TS_{NGF}$ value is smaller than the $TS_{GF}$ value; in other words, whether $TS_{NGF}$ occurs earlier than $TS_{GF}$. If so, the flow is switched to the non-guaranteed mode, i.e., the cells from the queue are scheduled for emission at a non-guaranteed rate (block 410), wherein the GCRA process shapes the UBR/BE traffic flow. When the time arrives for $TS_{GF}$, the flow mode switches back to the GFR mode wherein the cells of a next guaranteed service frame are scheduled for emission at the predetermined guaranteed rate (412). Further, if cells any unfinished frame have been scheduled via the UBR mode at the time of switching to the GFR mode, such unfinished frame is discarded.

Figure 5:
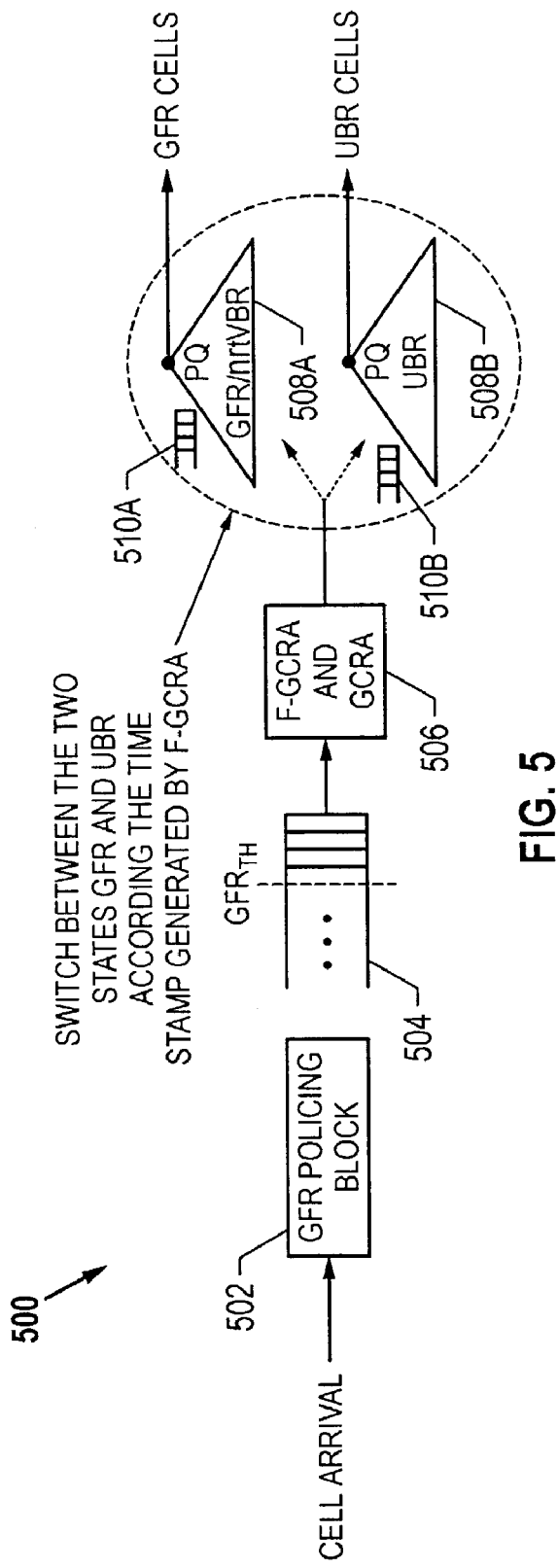
FIG. 5 depicts a system for implementing the GFR service of the present invention.

Referring now to FIG. 5, depicted therein is an exemplary system 500 for implementing the GFR service of the present invention. As alluded to hereinabove, a GFR policing block 502 is provided for ensuring traffic contract compliance using a CLP-based tagging. A guaranteed flow queue 504 having an appropriate threshold level is utilized for enqueuing the incoming tagged cells. An algorithmic process mechanism 506 forming a portion the LBM block described above is operable to compute the two types of timestamps necessary for switching between the GFR and UBR modes. It should be apparent that the functionality of the algorithmic process mechanism 506 may be realized in hardware, software, or any combination thereof. Reference numeral 508A refers to the PQ structure (i.e., heap) associated with the GFR scheduling mode for emission of the GFR cells, which can be thought of as emitting from a sub-flow queue 510A involving guaranteed service frames. Likewise, reference numeral 508B refers to the PQ structure associated with the non-guaranteed rate mode for emission of UBR/BE cells, which can be thought of as emitting from a sub-flow queue 510B. As explained in the foregoing, the algorithmic processor block 506 operates to compute future timestamps upon completion of a guaranteed service frame based on the GCRA and F-GCRA processes, and switches between the guaranteed and non-guaranteed modes depending on the TS values.

Figure 6:
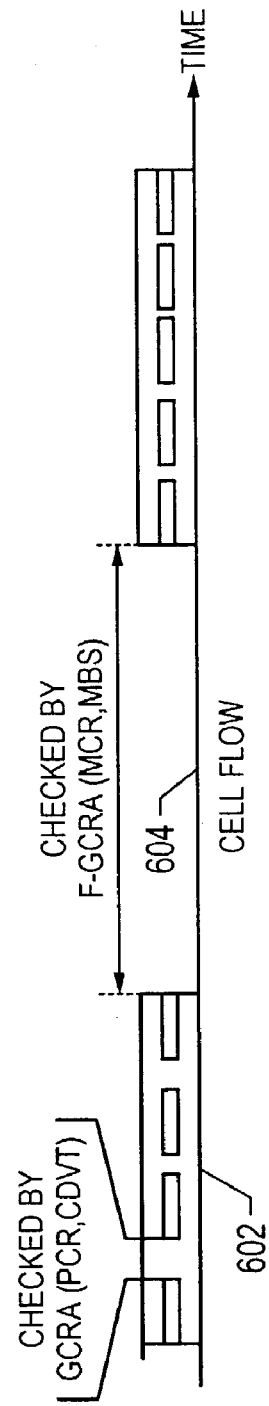
FIG. 6 depicts a representation of a GFR policing scheme.
Figure 7:
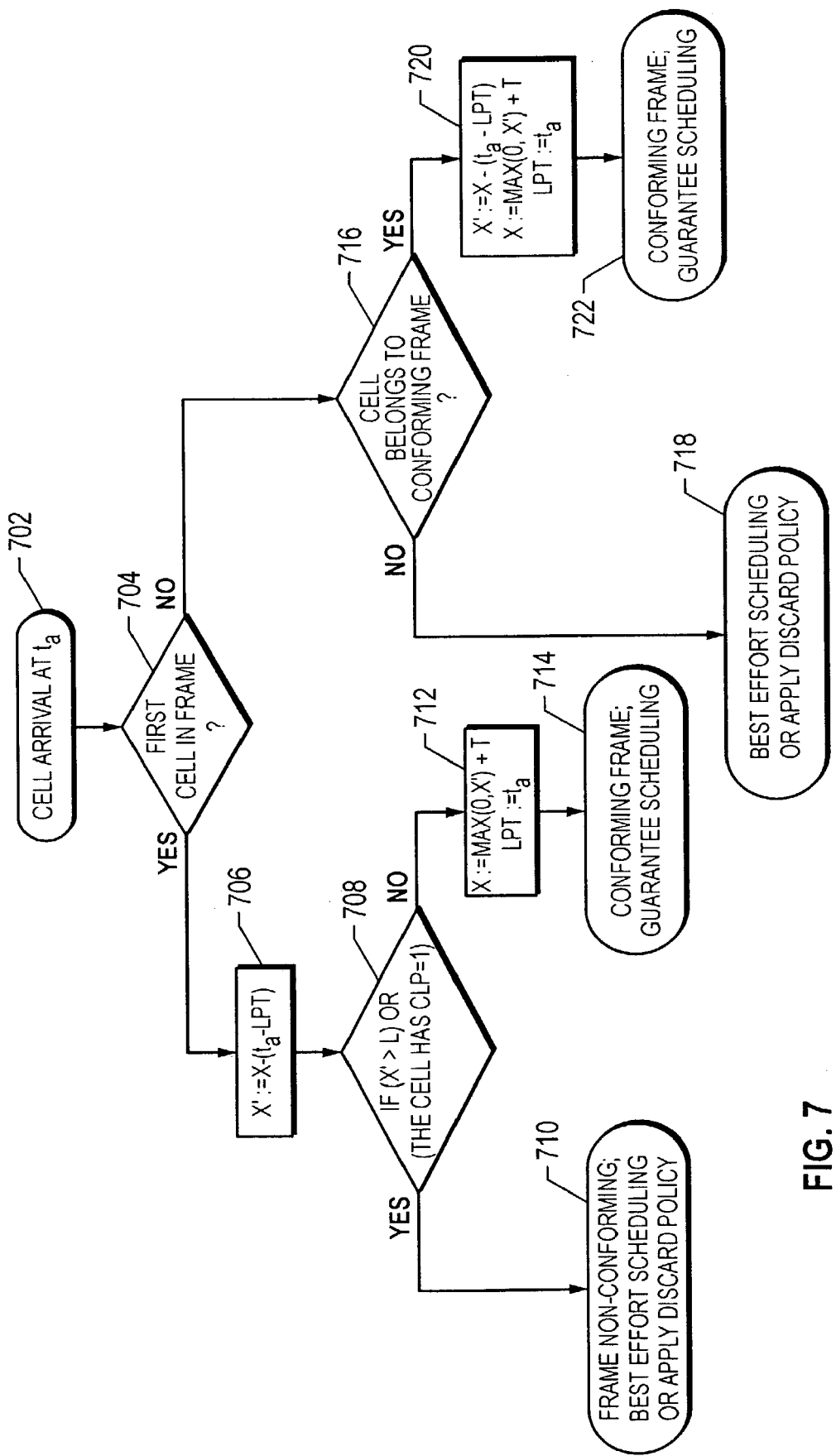
FIG. 7 is a flow chart of the operations involved in a GFR policing scheme.

FIG. 6 depicts a graphical representation of a GFR policing scheme that may be implemented for purposes of the present invention. The GFR policing scheme is comprised of two stages, both involving a leaky bucket implementation. The first stage is to determine if a packet (or frame) is compliant. This is accomplished by testing the following conditions: (i) the cell arrival is compliant with respect to the applicable GCRA function having the PCR and CDVT descriptors; (ii) all cells in a frame have the same CLP value; and (iii) the frame size does not exceed the MFS value. Reference numeral 602 refers to the portion of the cell flow checked by the GCRA process. The second stage (also a leaky bucket implementation) operates at the frame level, using the F-GCRA process with appropriate traffic descriptor parameters. Reference numeral 604 refers to the portion of the cell flow checked by the F-GCRA process. It should be appreciated that the net result of performing GFR policing is the separation between compliant frames that guarantee emission at MCR from the non-compliant frames that can be considered for the UBR/BE type service. FIG. 7 shows a flow chart with additional details regarding the GFR policing methodology. Upon arrival of a cell at $t_a$ (block 702), a determination is made whether the cell is the first of a frame (block 704). If so, certain computations and comparisons involving the leaky bucket parameters are performed as shown in blocks 706 and 708, where X denotes the value of the bucket counter, LPT is the Last Pass Time and X' is an auxiliary variable. If X' is greater than L or the cell has its CLP set (i.e., CLP=1), then the frame is considered to be non-conforming. Accordingly, either Best Effort scheduling or a suitable discard policy is implemented (block 710). Otherwise, the frame is considered to be conforming, and the bucket counter and LPT parameters are computed as set forth in block 712. The conforming frame is accordingly scheduled for service at a guaranteed rate (block 714).

If the cell is not the frame's first cell, another determination is made whether the cell belongs to a conforming frame (decision block 716). If so, certain LB parametrics are computed in block 720, where LPT is set to equal $t_a$. Thereafter, guaranteed rate scheduling is effected for the conforming frame (block 722). On the other hand, if the cell does not belong to a guaranteed frame, either Best Effort scheduling or a suitable discard policy is implemented (block 718).

Those skilled in the art will recognize that one of the issues in computing the LB parameters (TS, TAT, etc.) using the algorithmic processes set forth above for GFR implementation is the finite word size available for representing the parameters and the system clock. Due to this fact, once all counters and clocks employed in LB calculations reach their respective limits, they wrap around to zero. Of course, this limitation is not restricted to GFR service only; rather, any CoS implementation involving LB-based computations can have the same issue. Because of such hardware limitation, a potential concern arises after performing LB parametric updates and the flow queue of a connection becomes empty. One solution is to store the update results and associate them with the flow queue that was empty. Thereafter, when the flow becomes active again and its first cell arrives, the stored LB data can be used. However, there is no mechanism to indicate whether the clock has wrapped around and therefore the stored values are no longer valid (since they have become "stale"). Accordingly, an improvement will be necessary to track and maintain the parametric data without running the risk of becoming stale. In addition, it would be desirable to have such a solution as a background process so as to minimize the impact on the throughput.

Figure 8:
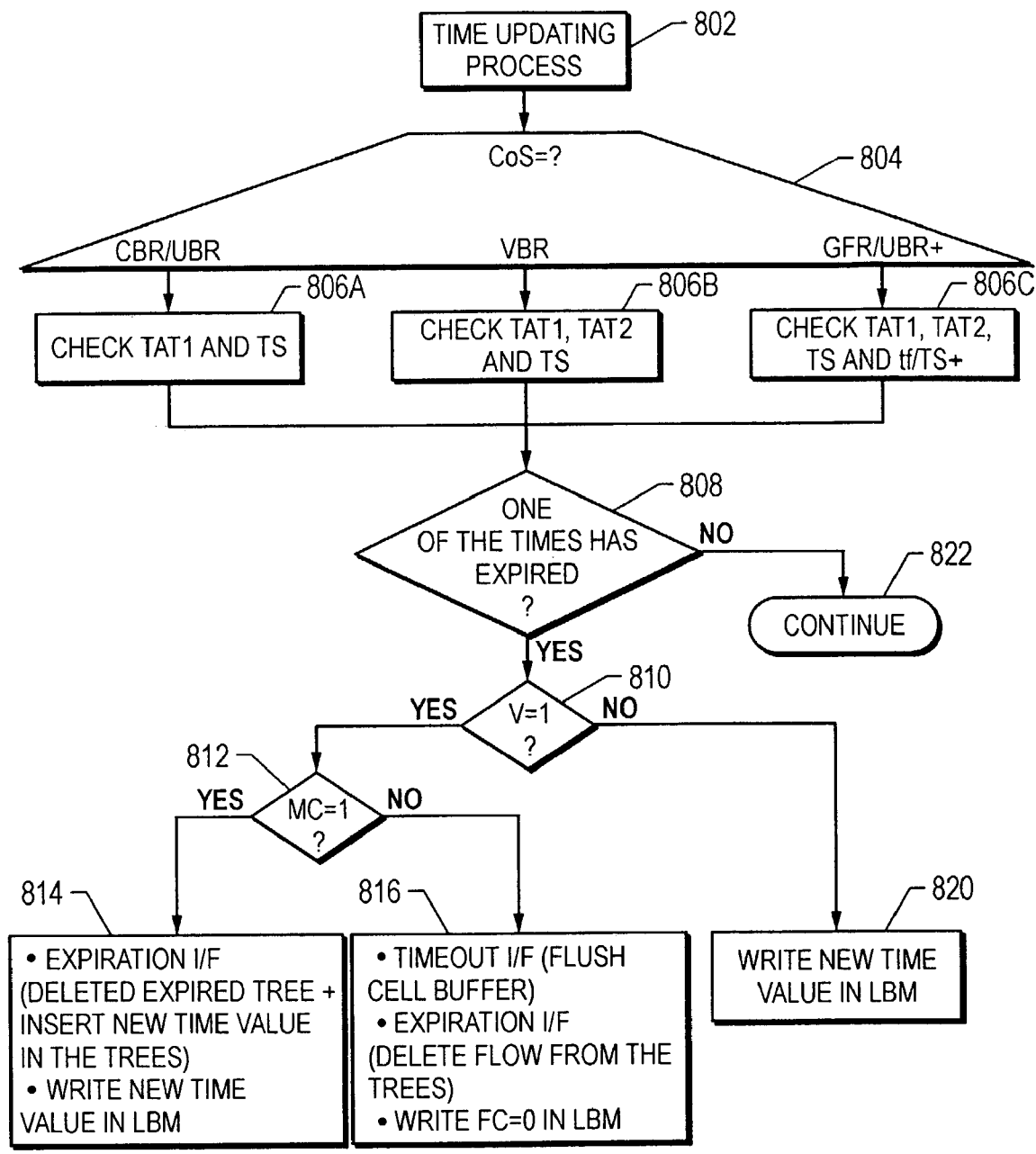
FIG. 8 is a flow chart of the operations involving treatment of time expiration in accordance with the teachings of the present invention.

The present invention advantageously provides for an arrangement wherein the concerns raised in the foregoing discussion are addressed. In essence, an algorithmic process is furnished for determining a time expiration condition with respect to the LB parameters involved in the various CoS implementations. When the expiration condition is detected, new values are substituted so that the flows that become alive again can participate in scheduling at appropriate times. FIG. 8 depicts a flow chart of the operations involved in the treatment of time expiration in accordance with the teachings of the present invention. A time updating process 802 is preferably implemented as a background process. As alluded to previously, the LB parameters are computed based on the service Class; accordingly, a determination is made as to the CoS involved (block 804). For CBR/UBR type, TAT1 (TAT for a single bucket) and TS are checked (block 806A). For VBR service, TAT1, TAT2 (TAT values for dual buckets) and TS are checked (block 806B). Likewise, for GFR/UBR+ service, two timestamps (TS=$TS_{NGF}$ and tf/TS+=$TS_{GF}$) are checked in addition to TAT1 and TAT2 values (block 806C). A determination is then made to verify if one these values has expired (decision block 808). If not, the process simply continues in a loop (block 822). Decision block 810 determines if any of the expired time values are stored in a PQ tree. If yes, another determination is made with respect to multicast connections (decision block 812). If the time values relate to a multicast connection, the expiration interface between the LBM and PQM (shown in FIG. 3) is used to delete the expired tree and to insert a new time value. The new value is provided to the LBM also. These operations are consolidated as block 814. If the connection is not multicast, the timeout interface between the LBM and QCM is used for flushing the cell buffer. The flow is thereafter deleted from the trees by utilizing the expiration interface. The FC parameter is then set to zero in the LBM. Block 816 consolidates these operations in the flow chart. If no expired time values are stored in a PQ tree (decision block 810), only a new value is provided to the LBM; no expiration or timeout interfaces are used for deletion or flushing (block 820).

Figure 9:
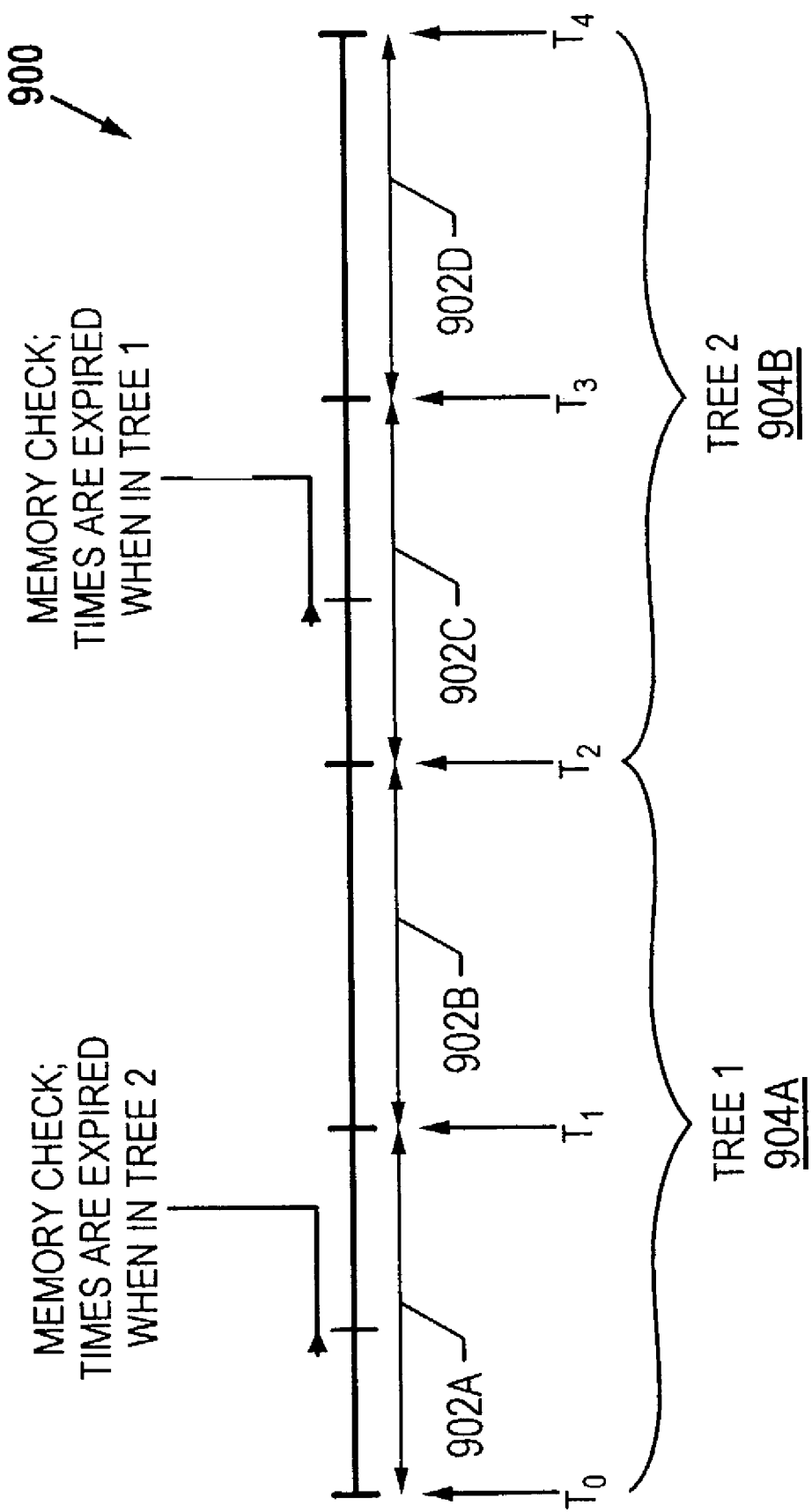
FIG. 9 depicts a multi-segment timing window arrangement for verifying expired time values.

FIG. 9 depicts a multi-segment timing window 900 for verifying expiration of time-related parametric values in accordance with the teachings of the present invention. Timing window 900 is comprised of four segments 902A-D of predetermined duration, forming two trees 904A and 904B of two segments each. The time expiration verification is made twice during the window 900; once in the first segment 902A for verifying whether the times used in the second tree 904B are expired, and again in the third segment 902C for verifying whether the times used in the first tree 904A are expired. Checking begins when the real time reaches a predetermined value in the appropriate time segments. Every cell slot, if the PQM enables the time expiration process (i.e., the process has enough time to handle an expiration command), the expiration block checks the timing parameters relative to one flow. As seen above, up to four time values need to be checked depending on the CoS. A time value is declared as expired when its Most Significant Bit (MSB) is different from the MSB of the real time. Further, a connection is considered as expired if one of the time values that have been checked relative to the connection has expired. Appropriate treatment is then provided to update the new time values as described hereinabove.

Based on the foregoing discussion, it should be appreciated that the present invention provides an innovative scheme for implementing the GFR service in an ATM environment, be it a switching fabric disposed in an access node or an area-wide transport network, wherein the deficiencies and shortcomings of the current GFR implementations are advantageously overcome. By treating the guaranteed and non-guaranteed portions of cell flow as two separate sub-flows with associated traffic shaping rules, not only do the overall memory requirements are minimized, but the throughput will be improved also. Further, one skilled in the art will readily recognize that although the GFR implementation scheme of the present invention has been set forth in the context of a hierarchical scheduler operable with an access node's ATM fabric, the teachings contained herein are not limited to such context only; rather they can be practiced in other ATM applications also.

It is believed that the operation and construction of the present invention will be apparent from the foregoing Detailed Description. While the embodiments of the invention shown and described have been characterized as being exemplary, it should be readily understood that various changes and modifications could be made therein without departing from the scope of the present invention as set forth in the following claims.

What is claimed is:

1. A method for implementing Guaranteed Frame Rate (GFR) service in an access network element having an Asynchronous Transfer Mode (ATM) switching fabric, comprising the steps:

enqueuing incoming cells identified for guaranteed service in a guaranteed flow queue;

upon determining onset of a guaranteed service frame, scheduling cells from said guaranteed flow queue for transport via said ATM switching fabric at a guaranteed rate;

determining a future timestamp ($TS_{GF}$) for scheduling a next guaranteed service frame;

determining a future timestamp ($TS_{NGF}$) for scheduling cells from said guaranteed flow queue at a non-guaranteed rate;

if said $TS_{NGF}$ is earlier than said $TS_{GF}$, scheduling cells from said guaranteed flow queue for transport at said non-guaranteed rate; and when said $TS_{GF}$ arrives, scheduling cells of a next guaranteed service frame at said guaranteed rate.

2. The method for implementing GFR service in an access network element as set forth in claim 1, wherein said $TS_{GF}$ is determined by an algorithmic process having parameters Peak Cell Rate (PCR), Cell Delay Variance Tolerance (CDVT), Maximum Cell Rate (MCR), and Maximum Burst Size (MBS).

3. The method for implementing GFR service in an access network element as set forth in claim 1, wherein said $TS_{NGF}$ is determined by an algorithmic process having parameters Peak Cell Rate (PCR) and Cell Delay Variance Tolerance (CDVT).

4. The method for implementing GFR service in an access network element as set forth in claim 1, wherein said incoming cells are policed by a GFR policing mechanism for compliance before said incoming cells are enqueued in said guaranteed flow queue.

5. The method for implementing GFR service in an access network element as set forth in claim 1, wherein said $TS_{NGF}$ is determined upon scheduling said guaranteed service frame's last cell.

6. The method for implementing GFR service in an access network element as set forth in claim 1, wherein said non-guaranteed rate is operable to support an Unspecified Bit Rate (UBR) service.

7. The method for implementing GFR service in an access network element as set forth in claim 1, wherein said non-guaranteed rate is operable to support a Best Effort (BE) service.

8. The method for implementing GFR service in an access network element as set forth in claim 1, further comprising the step of discarding cells of an unfinished frame scheduled for transmission at said non-guaranteed rate.

9. The method for implementing GFR service in an access network element as set forth in claim 1, further comprising the steps:
 verifying whether said $TS_{GF}$ has expired; and
 if so, updating said $TS_{GF}$ with an appropriate new value.

10. The method for implementing GFR service in an access network element as set forth in claim 1, further comprising the steps:
 verifying whether said $TS_{NGF}$ has expired; and
 if so, updating said $TS_{NGF}$ with an appropriate new value.

11. A system for implementing Guaranteed Frame Rate (GFR) service in an access network element having an Asynchronous Transfer Mode (ATM) switching fabric, comprising:
 a GFR policing block operable to enqueue incoming cells identified for guaranteed service in a guaranteed flow queue;
 means for scheduling cells from said guaranteed flow queue for transport via said ATM switching fabric at a guaranteed rate upon determining onset of a guaranteed service frame;
 means for determining a future timestamp ($TS_{GF}$) for scheduling a next guaranteed service frame;
 means for determining a future timestamp ($TS_{NGF}$) for scheduling cells from said guaranteed flow queue at a non-guaranteed rate;
 means for scheduling cells from said guaranteed flow queue for transport at a non-guaranteed rate if said $TS_{NGF}$ is earlier than said $TS_{GF}$; and
 means for scheduling cells of a next guaranteed frame at said guaranteed rate upon the occurrence of said $TS_{GF}$.

12. The system for implementing GFR service in an access network element as set forth in claim 11, wherein said $TS_{GF}$ is determined by a Leaky Bucket Module operable to execute an algorithmic process having parameters Peak Cell Rate (PCR), Cell Delay Variance Tolerance (CDVT) Maximum Cell Rate (MCR), and Maximum Burst Size (MBS).

13. The system for implementing GFR service in an access network element as set forth in claim 11, wherein said $TS_{NGF}$ is determined by a Leaky Bucket Module operable to execute an algorithmic process having parameters Peak Cell Rate (PCR) and Cell Delay Variance Tolerance (CDVT).

14. The system for implementing GFR service in an access network element as set forth in claim 11, wherein said $TS_{NGF}$ is determined upon scheduling said guaranteed service frame's last cell.

15. The system for implementing GFR service in an access network element as set forth in claim 11, wherein said non-guaranteed rate is operable to support an Unspecified Bit Rate (UBR) service.

16. The system for implementing GFR service in an access network element as set forth in claim 11, wherein said non-guaranteed rate is operable to support a Best Effort (BE) service.

17. The system for implementing GFR service in an access network element as set forth in claim 11, further comprising means to discard cells of an unfinished frame scheduled for transmission at said non-guaranteed rate.

18. The system for implementing GFR service in an access network element as set forth in claim 11, further including:
 means for verifying whether said $TS_{GF}$ has expired; and
 means for updating said $TS_{GF}$ upon determining that said $TS_{GF}$ has expired.

19. The system for implementing GFR service in an access network element as set forth in claim 11, further including:
 means for verifying whether said $TS_{NGF}$ has expired; and
 means for updating said $TS_{NGF}$ upon determining that said $TS_{NGF}$ has expired.

20. A system for implementing Guaranteed Frame Rate (GFR) service in an access network element having an Asynchronous Transfer Mode (ATM) switching fabric, comprising:
 a GFR policing block operable to enqueue incoming cells identified for guaranteed service in a guaranteed flow queue; and
 a scheduler for scheduling cells from said guaranteed flow queue for transport via said ATM switching fabric at a guaranteed rate upon determining onset of a guaranteed service frame, wherein said scheduler is operable to schedule cells from said guaranteed flow queue at a non-guaranteed rate when a timestamp ($TS_{NGF}$) for transmission at said non-guaranteed rate is earlier than a timestamp ($TS_{GF}$) for transmission of a next guaranteed service frame at said guaranteed rate.

21. The system for implementing GFR service in an access network element as set forth in claim 20, wherein said scheduler comprises a hierarchical scheduler operable to partition scheduling among multiple aggregation layers of said access network element.

22. The system for implementing GFR service in an access network element as set forth in claim 20, wherein said scheduler further includes means to discard cells of an unfinished frame scheduled for transmission at said non-guaranteed rate.

23. The system for implementing GFR service in an access network element as set forth in claim 20, wherein said $TS_{GF}$ is determined by a Leaky Bucket Module operable to execute an algorithmic process having parameters Peak Cell Rate (PCR), Cell Delay Variance Tolerance (CDVT), Maximum Cell Rate (MCR), and Maximum Burst Size (MBS).

24. The system for implementing GFR service in an access network element as set forth in claim 20, wherein said $TS_{NGF}$ is determined by a Leaky Bucket Module operable to execute an algorithmic process having parameters Peak Cell Rate (PCR) and Cell Delay Variance Tolerance (CDVT).

25. The system for implementing GFR service in an access network element as set forth in claim 20, wherein said $TS_{NGF}$ is determined upon scheduling said guaranteed service frame's last cell.

26. The system for implementing GFR service in an access network element as set forth in claim 20, wherein said non-guaranteed rate is operable to support an Unspecified Bit Rate (UBR) service.

27. The system for implementing GFR service in an access network element as set forth in claim 20, wherein said non-guaranteed rate is operable to support a Best Effort (BE) service.

\* \* \* \* \*